United States Patent
Akin et al.

(10) Patent No.: US 12,000,483 B2
(45) Date of Patent: Jun. 4, 2024

(54) MULTI-PART HOUSING SEAL, METHOD FOR THE AUTOMATED APPLICATION OF A MULTI-PART HOUSING SEAL, AND HOUSING COMPRISING A MULTI-PART HOUSING SEAL

(71) Applicant: TESA SE, Norderstedt (DE)

(72) Inventors: Deniz Nick Akin, Hamburg (DE); Kim Elsenbach, Bargteheide (DE); Li Wang, Hamburg (DE); Wilhelm Watzke, Hamburg (DE)

(73) Assignee: TESA SE, Norderstedt (DE)

( * ) Notice: Subject to any disclaimer, the term of this patent is extended or adjusted under 35 U.S.C. 154(b) by 187 days.

(21) Appl. No.: 17/792,290

(22) PCT Filed: Jan. 13, 2021

(86) PCT No.: PCT/EP2021/050583
§ 371 (c)(1),
(2) Date: Jul. 12, 2022

(87) PCT Pub. No.: WO2021/144305
PCT Pub. Date: Jul. 22, 2021

(65) Prior Publication Data
US 2023/0041058 A1     Feb. 9, 2023

(30) Foreign Application Priority Data
Jan. 15, 2020   (DE) ..................... 10 2020 200 450.1

(51) Int. Cl.
*F16J 15/02*     (2006.01)

(52) U.S. Cl.
CPC ........... *F16J 15/022* (2013.01); *F16J 15/028* (2013.01)

(58) Field of Classification Search
CPC .......... F16J 15/022; F16J 15/028; F16J 15/10; F16J 15/102; F16J 15/104
See application file for complete search history.

(56) References Cited

U.S. PATENT DOCUMENTS

| | | | |
|---|---|---|---|
| 9,878,471 B2 * | 1/2018 | Guan | ............... B29C 39/203 |
| 2012/0326391 A1 * | 12/2012 | Hirose | ............... F16J 15/102 |
| | | | 277/637 |

(Continued)

FOREIGN PATENT DOCUMENTS

| DE | 9106710 U1 | 11/1991 |
|---|---|---|
| DE | 10308375 A1 | 9/2003 |

(Continued)

OTHER PUBLICATIONS

German Office Action dated Aug. 18, 2020, in connection with German Application No. 10 2020 200 450.1.

(Continued)

*Primary Examiner* — Nicholas L Foster
(74) *Attorney, Agent, or Firm* — Norris McLaughlin, P.A.

(57) ABSTRACT

Housing seals and methods seal off a housing interior from a housing exterior. The housing seals and methods comprise a first elastic adhesive strip and a second elastic adhesive strip, the first and second adhesive strips being arranged between a first housing element and a second housing element. The first adhesive strip comprises a first end portion having a first front side and a first edge face, and a second end portion having a second front side and a second edge face, and is arranged between the first housing element and the second housing element such that the second housing element, with the exception of the application gap, in a closed circulation.

16 Claims, 6 Drawing Sheets

(56) References Cited

U.S. PATENT DOCUMENTS

Figure 1:
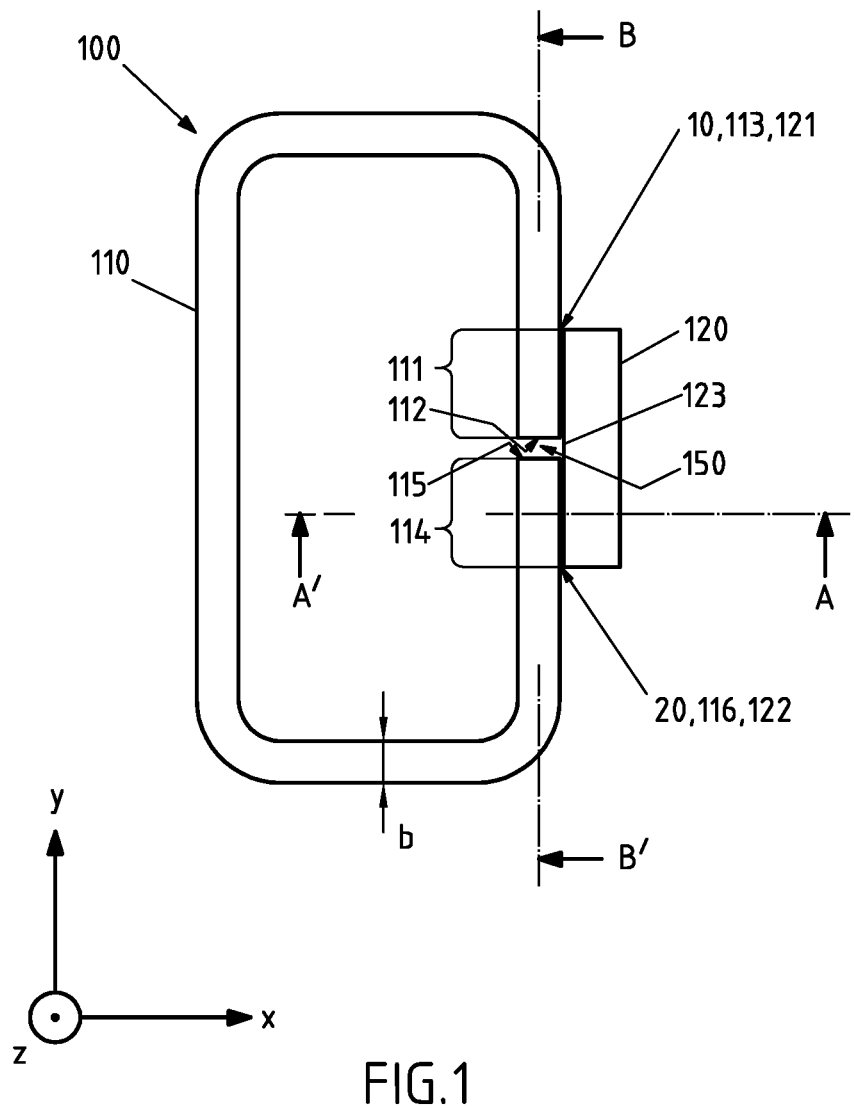

2014/0367926 A1\* 12/2014 Guan .................... B29C 39/18
                                                                       427/322
2015/0369365 A1\* 12/2015 Hirose ................... C09J 11/06
                                                                       277/637

FOREIGN PATENT DOCUMENTS

| DE | 102010038429 A1 | 1/2012 |
| DE | 202018105005 U1 | 7/2019 |
| EP | 1235007 A2 | 8/2002 |
| EP | 2194108 A1 | 6/2010 |
| EP | 2541104 A2 | 1/2013 |
| EP | 3346518 A1 | 7/2018 |
| EP | 3401455 A1 | 11/2018 |
| JP | 2014142379 A | 8/2014 |
| JP | 2015041072 A | 3/2015 |
| WO | 2016/024939 A1 | 2/2016 |

OTHER PUBLICATIONS

International Search Report issued Mar. 18, 2021, in connection with PCT International Application No. PCT/EP2021/050583.
English translation of International Search Report issued Mar. 21, 2021, in connection with PCT International Application No. PCT/EP2021/050583.

\* cited by examiner

MULTI-PART HOUSING SEAL, METHOD FOR THE AUTOMATED APPLICATION OF A MULTI-PART HOUSING SEAL, AND HOUSING COMPRISING A MULTI-PART HOUSING SEAL

This application is a 371 of PCT/EP2021/050583, filed Jan. 13, 2021, which claims foreign priority benefit under 35 U.S.C. § 119 of the German Patent Application No. 10 2020 200 450.1, filed Jan. 15, 2020, the disclosures of which are incorporated herein by reference.

The invention relates to a multipartite housing seal. The invention also relates to a method for automated application of a multipartite housing seal, and to a housing comprising a multipartite housing seal.

The invention relates to the technical field of the seals as are employed in the household and in industry widely for the purposes of sealing off and preventing fluid communication between two volumes. Proposed more specifically for the sealing off is a multipartite housing seal where the multipartite seal is not inherently closed but instead consists of infinitely long sealing strips.

Seals are required for numerous constructions in different fields of the art, such as in building construction and in vehicle construction, for example. The sealing elements used for these purposes are intended to seal off gaps, such as are formed almost unavoidably when two components are connected, frequently to counter penetration by moisture and air, in order to preserve parts situated behind the seals from damage caused by such air and moisture ingress, such as against corrosion, for example. Mechanical connections, of the kind produced by bolts, for example, are as a general rule not capable of providing sufficient sealing.

Use is therefore made frequently, for example, of silicone sealants in order to achieve corresponding sealing of the connections produced. Such sealants can be processed very reliably, but require a certain time to cure and so often give rise to processing difficulties. A similar situation arises with other structural adhesives and sealants, such as with those based on epoxies or polyurethanes, for example.

Sealants used also include silicone foams, which are notable for good flame retardancy properties and the possibility of being used again. It is, though, difficult to process them in an automated operation, and they are also comparatively expensive.

Butyl sealants are established and inexpensive, but in terms of their metering are difficult to control and lack good aging resistance. When the pressures are relatively high, moreover, they are frequently squeezed out of the gap.

Elastic sealants such as natural rubbers and styrene-butadiene rubbers offer tried-and-tested sealing properties and are also very temperature-stable. Because they are not self-adhering, however, they are fairly difficult to manage; moreover, they are inflexible, and the sealing element in question must therefore be an exact fit with the gap that is to be sealed.

Polyurethane foams exhibit good compression characteristics and can be processed in an automated manner; moreover, foam-in-place applications are possible. A disadvantage are fluctuations in the dimensions of the foam in question, and these substances are also susceptible to corrosion and degradation when exposed to certain cleaning products.

A similar profile of properties is displayed by EPDM foams, which also achieve only limited sealing effect on account of their irregular surface configuration.

EP 3 346 518 A1 discloses a seal which is applied to a cover and/or tub of a battery module housing. In this instance a sealing material is let into a depression in order to improve a sealing effect. The seal is a "form-in-place foam gasket" (FIPFG), where liquid foam is applied to a cover or tub of a housing. This application has the aforesaid disadvantages arising for foamed or liquid-applied sealants.

DE 9 106 710 U1 discloses a multipartite flat seal, where a flat seal is composed of multiple portions of a conventional sealing material. The parts are connected to one another via serpentine incisions performed complementarily, in order to achieve a form-fit at the contact points.

A disadvantage of this is that the parts of which the flat seal is composed are costly and inconvenient to produce and process. The operation of application also is very costly and inconvenient, as the parts have to be placed matchingly into one another. The multipartite flat seal described has little to no suitability for automated application, owing to the very exacting requirements for precision of application.

DE 20 2018 105 005 U1 discloses a multipartite flat seal with metal insert and positioning pins. The metal insert serves as a "positioning rail" for the elastomer seal injection-molded onto it. The positioning rails can be placed against one another and thus larger seals can be assembled without the need to produce large diecuts for this purpose. The sealing approach described is very complex in production and use, as it is composed of various components. The portions more particularly are not continuous material, instead consisting of metal portions which must be manufactured individually and adapted to the sealing shape.

There is therefore a need for systems which are readily employable and processible for the reliable sealing of connections between structural components.

It was therefore an object of the invention to provide a sealing material which is easy to apply, has a high sealing effect with respect to air and moisture, and which offers the possibility, as well, of opening the sealed-off opening again and closing it again without complication.

One application is in the area of battery modules. The modules contain a multiplicity of battery cells, which must be protected in a housing from mechanical exposure from externally, but also against the effects of moisture. For this purpose between housing cover and housing tub there is a flange formed, which is sealed off by a sealant. The use of sealants has the disadvantages described above.

It is an object of the invention to overcome the disadvantages stated for sealants above. It is an object of the invention, moreover, to enable simple and reliable automated application of the multipartite housing seal.

The object is achieved in its first aspect by a multipartite housing seal having the features of claim 1.

The invention relates accordingly to a multipartite housing seal for sealing off a housing interior from a housing exterior, comprising a
first elastic adhesive strip and a second elastic adhesive strip, the first and second adhesive strips being arranged between a first housing element and a second housing element, wherein
   the first adhesive strip comprises a first end portion having a first front side and a first edge face, and a second end portion having a second front side and a second edge face, and is arranged between the first housing element and the second housing element in such a way that
     the first front side and the second front side are arranged opposite one another and separated from one another by an application gap, and the first and second edge faces lie substantially in a plane, and where the first adhesive strip is arranged between the first housing element and the second housing element, with the exception of the application gap, in a closed circulation, and the second adhesive strip is arranged between the first housing element and the second housing element in such a way that a first edge face of the second adhesive strip is in contact with the first edge face of the first adhesive strip and forms a first sealing gap, and a second edge face of the second adhesive strip is in contact with the second edge face of the first adhesive strip and forms a second sealing gap, and a third edge face of the second adhesive strip conceals the application gap, so that if the first housing element and the second housing element are pressed against one another with a force F, the first elastic adhesive strip and the second elastic adhesive strip are compressed and they expand in the direction of the edge faces, with the effect that the first edge face of the second adhesive strip and the first edge face of the first adhesive strip are pressed against one another and seal off the first sealing gap, and the second edge face of the second adhesive strip and the second edge face of the first adhesive strip are pressed against one another and seal off the second sealing gap, thereby preventing fluid communication between the housing interior and the housing exterior.

The sealing is now accomplished, accordingly, by means of an adhesive tape which is separated by a length into adhesive strips and can be applied in an automated manner and in a specific arrangement to housing elements, and so permits 100% automated application and sealing.

The invention is based on the finding that by means of an arrangement according to the invention it is possible to generate a closed ring, composed of a plurality of elastic adhesive strips, that withstands watertightness and corrosion tests, from a continuous elastic adhesive tape—that is, not a diecut flat seal but rather an adhesive strip which is unwound from an adhesive tape roll and removed. A particular feature of the invention described here is therefore that the housing seal is constructed of a plurality of parts. Use is made conventionally of seals which are inherently closed, such as sealing rings or a flat seal diecut from a sheet. These seals do not have any gap or interruption, but instead form an inherently closed circulation.

In accordance with the invention two elastic adhesive strips which are infinitely long and not inherently closed are arranged on a housing element, such as a sealing flange of a housing, for example, in such a way that the closing of the housing is accompanied by a sealing effect which reliably prevents penetration of moisture into the housing interior. The first adhesive strip in this arrangement forms a not completely closed circulation. The circulation may describe any desired profile or contour. The circulation is not closed because it is interrupted by the application gap. The circulation of the first adhesive strip is located preferably in a plane—that is, the first adhesive strip is applied, i.e., adhered, on a housing element, lying in a plane.

The sealing material used in the invention is formed by elastic adhesive strips which are provided as portions of an adhesive tape. Adhesive tapes are conventionally provided in fixed lengths, such as product by the meter, for example, or as continuous product, in the form of rolls (Archimedean spiral) or coils wound onto a core.

Where mention is made of an adhesive strip hereinafter, the reference is always to an elastic adhesive strip.

In the sense of the invention, an adhesive tape comprehends all sheetlike structures such as two-dimensionally extended films or film portions, tapes with extended length and limited width, tape portions and the like, and lastly also diecuts. An adhesive tape in the sense of the invention may have been furnished with an adhesive on one or both sides. Adhesive tapes typically have running lengths of a few 10 m to 30 000 m. Typical widths for adhesive tape rolls or adhesive tape coils are 10, 15, 19, 25 and 30 mm. Other running lengths and adhesive tape widths also exist, however, and are not excluded from the teaching of the invention. The adhesive tape may be in the form of a roll, in other words in the form of an Archimedean spiral wound up onto itself, or may have been wound onto a spool element.

An adhesive tape has a superficially extended top side and a bottom side opposite the top side. Top side and bottom side are in a substantially coplanar arrangement at a distance d corresponding to the thickness of the adhesive tape, and each have a width b. At the edges of the adhesive tape there are edge faces which are arranged substantially perpendicular to the top side and the bottom side. The virtual perpendicularity of the edge faces is a result of the production of an adhesive tape from a parent roll on high-precision manufacturing lines which slit off multiple adhesive tapes from a parent roll—that is, the parent roll is singulated by means of roll knives, for example. Another effect of the manufacturing lines is that the edge faces of an adhesive tape are virtually planar, thus being uniformly flat in the longitudinal direction of the adhesive tape, and that. The width b of an adhesive tape is typically greater than or the same as the thickness d. The edge faces therefore have a high surface quality and are exact in their geometric arrangement relative to the top and bottom sides of the adhesive tape. The longitudinal direction is indicated by the direction of the adhesive tape in which it is wound or unwound. An adhesive tape has the longest extent in the longitudinal direction.

An adhesive strip in the sense of the invention comprehends a portion removed from an adhesive tape. In the sense of this invention the general expression "adhesive strip" embraces all sheetlike structures furnished self-adhesively on one or both sides, such as two-dimensionally extended films or film portions, tapes with extended length and limited width, tape portions, diecuts and the like, and also corresponding multilayer arrangements. The geometries and properties of the adhesive tape described above are also valid for adhesive strips, since an adhesive strip in the sense of the invention is merely a removed part of an adhesive tape.

The length of an adhesive strip is therefore always less than the length of an adhesive tape. As a result of its removal from the adhesive tape, an adhesive strip generally has two cut edges. The cut edges form the front sides of the adhesive strip. They typically have a substantially perpendicular arrangement. Since, however, an adhesive strip is frequently removed only when in use, by a worker or by a machine, it cannot be assumed here that the front side will have such a high surface quality and exact geometric arrangement relative to the top side and the bottom side of the adhesive strip.

The invention skillfully takes account of this technical effect in that the arrangement of the multipartite housing seal is such that only the well-defined edge faces of the adhesive tape strips are brought into contact with one another and form the sealing gap.

The arrangement of the multipartite housing seal, in particular the use of a second adhesive strip for sealing, thus effectively avoids the use of cut edges generated at the location of application to form a sealing gap and seal it off.

Furthermore, the multipartite housing seal of the invention also acknowledges the fact that in an automated application operation, the front sides of the adhesive strips cannot be applied infinitely close to or even in contact with a housing element by an applicator. An automated adhesive tape applicator, preferably a robot-guided adhesive tape applicator, is subject to limitations which prevent or at least greatly hinder the application of adhesive tapes from continuous portions which are in contact with one another via their front sides. The multipartite housing seal of the invention circumvents this application problem by providing an application gap; the front sides are thus not brought into contact. The adhesive strips are applied to a housing element such that a defined application gap $l_A$ is produced. As a result, in particular, the surface quality of the front sides of the first adhesive strip and their precise geometric arrangement become negligible with regard to the achievement of the sealing effect of the multipartite housing seal.

A further effect of the application gap is to prevent the end portions overlapping—for example, to prevent the bottom side of a first end portion of the first adhesive strip overlapping with the top side of a second end portion of the first adhesive strip. This case may occur as a result of inexact application by the application head. This would lead to leakage of the multipartite housing seal.

However, there is nothing at all to rule out the first sealing strip being arranged in such a way, whether manually or by a robot-guided application head, that the first and second front faces are in contact. A sealing effect can also be achieved in that case. If the front faces are not in contact, however, this leads to the aforesaid advantages.

"Elastic" refers to the property of an adhesive strip or adhesive tape of changing its geometric shape on exposure to force and, when the exposure force drops away, of reverting to the original shape existing prior to the force exposure. In this context the term "elastic" is intended to comprehend not only linear-elastic behavior on the part of the adhesive strips but also non-linear elastic behavior on the part of the adhesive strips. As the adhesive strips comprise polymer materials, the term "elastic" also comprehends a viscoelastic behavior.

If the first housing element and the second housing element are pressed against one another with a force F, the first and second elastic adhesive strips are compressed, i.e., deformed, and expand in the direction of the edge faces, in other words transverse to the longitudinal direction of the adhesive strips. The force in this case acts superficially, preferably equidistributed over the entire contact area between first and second adhesive strips and the first and second housing elements, in other words uniformly distributed over the top side and bottom side of the adhesive strips, and not, for instance, locally.

As a result of the expansion of the adhesive strips in the direction of the edge faces, the edge faces of the first and second adhesive strips that are in contact are pressed against one another and so seal off the first and second sealing gaps. In that case, fluid communication between the housing interior and the housing exterior is reliably prohibited.

Because the multipartite housing seal is not closed, but instead consists of two finite adhesive strips in strip form, the sealing gap is the weak point for the sealing. As has emerged, the arrangement of the adhesive strips is very important. It has an important influence on the one hand on the sealing of the multipartite housing seal and on the other hand on the operational reliability of the automated application. The properties of the adhesive strips and their layer construction, however, must also be tailored to this use.

The first and second adhesive strips comprise a pressure sensitive adhesive, this being an adhesive which even under relatively weak applied pressure permits a permanent bond to virtually any substrates. At room temperature, a pressure sensitive adhesive has a permanent tack, thus having a sufficiently low viscosity and a high touch-stickiness, and so it wets the surface of the respective bonding substrate even with low applied pressure. The bondability of the adhesive derives from its adhesive properties, and the redetachability from its cohesive properties.

An adhesive in the sense of the invention may be an adhesive based on natural rubber, synthetic rubber or acrylate. Other adhesives may also be used, however. Besides the adhesive, the composition may further comprise substances such as, for example, chemical or mechanical stabilizers, color pigments, fibers, granules, phosphorescent substances, substances with medicinal activity or medicinal products, magnetic or magnetizable particles, or other substances which may condition the properties of the adhesive. In particular the term "adhesive" also comprehends a pressure sensitive adhesive.

A "pressure sensitive adhesive" is understood, in accordance with the general understanding of the skilled person, to refer to a viscoelastic adhesive whose set, dry film at room temperature is permanently tacky and remains adhesive and may be bonded to a multiplicity of substrates by gentle applied pressure.

As a result of the fact that the multipartite housing seal of the invention is adhered on one side to one of the housing elements, the multipartite housing seal remains at the site at which it has been applied. In particular it does not fall out, as is the case with sealing rings, sealing cords or flat seals which lack self-adhesiveness. As well as the resultant handling advantages, this ensures that the sealing effect of the multipartite housing seal is regained—in spite of the opening of the housing and parting of the housing elements from one another—on reclosure, as there is no change in the arrangement of the first and second adhesive strips.

An adhesive tape consists in general of a carrier and at least one adhesive applied thereon. However, there are also adhesive tapes without carrier. With particular preference the first and second adhesive strips have a carrier-free construction, the carrier being formed by an adhesive itself.

As has emerged, the arrangement of two adhesive strips in accordance with the invention can be used advantageously for sealing housings, on the one hand permitting simple, reliable and precise application and on the other hand enabling easy disassembly of the individual housing elements of a housing.

A possible advantageous development of the multipartite housing seal is that wherein the second adhesive strip is arranged opposite the first adhesive strip such that a longitudinal direction of the second adhesive strip
    runs parallel to a longitudinal direction of the first end portion, and
    runs parallel to a longitudinal direction of the second end portion.

By the parallel arrangement of the second adhesive strip to the longitudinal direction of the first end portion, the first edge face of the second adhesive strip and the first edge face of the first adhesive strip are also in a parallel arrangement. The edge faces which are in contact and which form the sealing gap are thus arranged lying flatly on one another. As a result, the sealing gap is sealed off in a particularly uniform manner, as on sealing the force acting on the edge faces in contact as a result of the expansion of the adhesive strips is distributed uniformly.

This also applies analogously to the second edge face of the second adhesive strip with the second edge face of the first adhesive strip.

A longitudinal direction of the adhesive tape refers to the direction in which an adhesive tape is typically unwound. This direction is defined, generally speaking, by the lengthwise extent of the adhesive tape. In the case of adhesive tape portions or adhesive tape cut shapes whose portion or cut shape is shorter than the width of the region of adhesion, the longitudinal direction of the adhesive tape is defined by the shorter extent of the portion or cut shape. Diecuts or labels are also to be included by references to portions or cut shapes.

As a result of the parallel arrangement, in particular, the edge faces are in a coplanar arrangement and this leads to a better sealing effect in the first and second sealing gaps when the first housing element and the second housing element are pressed against one another with a force F.

This arrangement also simplifies the application of the adhesive strips, since during an application operation the first and second adhesive strips are moved only linearly, thus without describing a curvature or curve, in the region of the edge faces that are in contact. Another effect of this is that the application operation can be carried out more simply and more reliably and that a sealing effect of the multipartite housing seal can be ensured.

It is, however, also possible to allow the first and second adhesive strips to describe a curve in the region of the edge faces that are in contact. A sufficient sealing effect of the first and second sealing gaps can be achieved even with such an arrangement.

The construction or the layer sequence of the adhesive strips encompasses a plurality of variants. In one preferred configuration of the elastic adhesive strips, the adhesive strips comprise a polymer foam layer and a pressure sensitive adhesive layer. The uncoated side of the polymer foam layer has a weaker peel adhesion than the pressure sensitive adhesive layer. The polymer foam layer preferably comprises at least one poly(meth)acrylate.

A possible advantageous development of the multipartite housing seal is that wherein the first and/or second adhesive strip comprises a polymer foam layer, and a first side of the polymer foam layer has a pressure sensitive adhesive layer.

The polymer foam layer, more particularly the matrix material of the polymer foam layer, comprises at least one poly(meth)acrylate. A "poly(meth)acrylate" is a polymer which is obtainable by radical polymerization of acrylic and/or methacrylic monomers and also, optionally, further, copolymerizable monomers. More particularly a "poly (meth)acrylate" is a polymer whose monomer basis consists to an extent of at least 50 wt % of acrylic acid, methacrylic acid, acrylic esters and/or methacrylic esters, where acrylic esters and/or methacrylic esters are included at least proportionally, preferably to an extent of at least 30 wt %, based on the overall monomer basis of the polymer in question.

The polymer foam layer preferably comprises poly(meth) acrylates at in total 40 to 99.9 wt %, more preferably at in total 60 to 98 wt %, more particularly at in total 75 to 95 wt %, for example at in total 80 to 90 wt %, based in each case on the total weight of the polymer foam layer. There may be one (single) poly(meth)acrylate or two or more poly(meth) acrylates present; in the continuation of the present description as well, therefore, the plural expression "poly(meth) acrylates" includes in its meaning, as does the expression "in total", the presence both of a single poly(meth)acrylate and of two or more poly(meth)acrylates.

The glass transition temperature of the poly(meth)acrylates is preferably <0° C., more preferably between −20 and −50° C. The glass transition temperature of polymers or of polymer blocks in block copolymers is determined in the invention by means of dynamic scanning calorimetry (DSC). For this technique, around 5 mg of an untreated polymer sample are weighed into an aluminum crucible (volume 25 µl) and closed with a perforated lid. Measurement takes place using a DSC 204 F1 from Netzsch. For inertization, the procedure takes place under nitrogen. The sample is cooled first to −150° C. then heated at a heating rate of 10 K/min to +150° C., and cooled again to −150° C. The subsequent second heating curve is run again at 10 K/min and the change in the heat capacity is recorded. Glass transitions are recognized as steps in the thermogram.

The poly(meth)acrylate preferably comprises at least a proportionally copolymerized functional monomer, more preferably a monomer which is reactive with epoxide groups to form a covalent bond. Very preferably the proportionally copolymerized functional monomer, more preferably monomer reactive with epoxide groups to form a covalent bond, contains at least one functional group selected from the group consisting of carboxylic acid groups, sulfonic acid groups, phosphonic acid groups, hydroxyl groups, acid anhydride groups, epoxide groups and amino groups; more particularly it contains at least one carboxylic acid group. Very preferably the poly(meth)acrylate comprises proportionally copolymerized acrylic acid and/or methacrylic acid. All of the groups stated exhibit reactivity with epoxide groups, so making the poly(meth)acrylate advantageously amenable to thermal crosslinking with epoxides that are introduced.

The poly(meth)acrylates are preferably crosslinked by means of epoxide(s) and/or by means of one or more substances containing epoxide groups. The substances containing epoxide groups are, more particularly, polyfunctional epoxides, i.e., those having at least two epoxide groups; correspondingly there is, all in all, an indirect linking of the building blocks of the poly(meth)acrylates that carry the functional groups. The substances containing epoxide groups may be both aromatic and aliphatic compounds.

The pressure sensitive adhesive layer comprises one or more poly(meth)acrylates preferably to an extent of at least 50 wt %, more preferably at least 70 wt %, very preferably at least 90 wt %, more particularly at least 95 wt %, for example at least 97 wt %, based in each case on the total weight of the pressure sensitive adhesive layer.

The poly(meth)acrylate of the outer pressure sensitive adhesive layer has its origins in particular in a monomer composition consisting of 70 to 95 wt % of 2-ethylhexyl acrylate, n-butyl acrylate and/or isobornyl acrylate, more particularly n-butyl acrylate and 2-ethylhexyl acrylate;

1 to 15 wt % of acrylic acid; and 0 to 15 wt % of methyl acrylate.

The poly(meth)acrylates of the outer pressure sensitive adhesive layer are crosslinked preferably thermally, more particularly covalently and/or coordinatively. Preferred covalent crosslinkers are epoxy compounds; preferred coordinative crosslinkers are aluminum chelates.

The weight-average molecular weight $M_w$ of the poly (meth)acrylates of the outer pressure sensitive adhesive layer is preferably 20 000 to 2 000 000 g/mol, more preferably 100 000 to 1 500 000 g/mol, more particularly 200 000 to 1 200 000 g/mol. The figures for the average molecular weight $M_w$ in this specification are based on the determination by gel permeation chromatography.

A possible advantageous development of the multipartite housing seal is that wherein the polymer foam layer itself is a pressure sensitive adhesive, more particularly a pressure sensitive adhesive, acrylate-based polymer foam, more particularly comprising at least one poly(meth)acrylate. With regard to the properties and formulations, reference may be made at this point to the preceding observations regarding the polymer foam layer, more particularly the matrix material of the polymer foam layer.

The multipartite housing seal is able as a result to profit from the advantages in sealing that are possessed by acrylate-based pressure sensitive adhesives. An acrylate-based polymer foam has viscoelastic properties. As a result, the first and second adhesive strips, on contact of the first and second edge faces of the first and second end portions, flow onto the first and second edge faces of the second adhesive strip. The flowing-on behavior known for viscoelastic materials, which can be equated with strong wetting of a surface, improves the sealing effect of the multipartite housing seal in the sealing gaps. An acrylate-based polymer foam, moreover, has very good temperature stability in temperature ranges of −20-+120° C., with an acrylate-based polymer foam even withstanding temperatures up to 220° C. over the short term. These pressure sensitive adhesives, moreover, have outstanding cold shock resistances, and this is very important for numerous applications, in the field of automobile construction, for example. One particularly important property of acrylate-based polymer foams is that they have elongations at break of 1000% or more. This means that an acrylate-based polymer foam can be stretched to a particularly great extent without breaking. This property is particularly advantageous for the multipartite housing seal of the invention. The high tear strength also makes it possible to compensate differences in thermal expansion of materials that are unalike. As a result, the housing elements to be sealed off can be manufactured from different materials having very different coefficients of thermal expansion. For example, a housing cover may be made of ABS material (acrylonitrile-butadiene-styrene copolymer), and a housing tub of aluminum. The plastics material has a substantially lower coefficient of thermal expansion by comparison with aluminum. Moreover, the acrylate-based polymer foam exhibits outstanding aging resistance, moisture resistance and chemical resistance, this being particularly advantageous for the reliability and longevity of the multipartite housing seal.

A possible advantageous development of the multipartite housing seal is that wherein the first and/or second adhesive strip comprises a further pressure sensitive adhesive layer, where a second side of the polymer foam layer bears the applied further pressure sensitive adhesive layer, and the second side is opposite the first side. The further pressure sensitive adhesive layer preferably corresponds to one of the aforesaid formulations of the pressure sensitive adhesive layer.

With particular preference the peel adhesion of the further adhesive layer applied on the second side of the polymer foam layer is weaker than the peel adhesion of the pressure sensitive adhesive layer applied on the first side of the polymer foam layer. In other words, one side of the polymer foam layer is weakly adhesive. This is intended to mean that the adhesion force of the weakly adhesive layer is less than the adhesion force of the layer by which the elastic adhesive strip is applied, i.e., adhered, to a housing element. This can be achieved by means of a pressure sensitive adhesive layer which is applied to the polymer foam layer and has only weakly adhesive properties. Although in that case first or second housing element then attaches more strongly to the further adhesive layer, it is nevertheless also possible in this way to improve the sealing effect between the first and second housing elements. The fact that the second side of the polymer foam layer has a further adhesive layer improves the sealing effect between the housing element and the polymer foam layer—that is, on the top side of the adhesive strips, for example. The reference here is not to the first and second sealing gaps, but rather to the top or bottom side, arranged perpendicularly to said gaps, of the first and second adhesive strips which are in contact with the housing elements. Where this one side is weakly adhesive, it is possible more reliably to prevent fluid communication also at the contact faces between housing element and adhesive strip (top side, bottom side of the adhesive strips).

On the other hand it is possible, through the weakly adhesive form of a further adhesive layer, to ensure that the multipartite housing seal, when the housing elements are parted and separated from one another, remains completely on the housing element which is in contact with the pressure sensitive adhesive layer having the greater peel adhesion. Where one side of the adhesive strips has a sufficiently low peel adhesion, the first and second housing elements can be separated again after they have been assembled, without the multipartite housing seal being damaged, let alone destroyed, in the process. The multipartite housing seal can therefore be used again, this being sustainable and removing the need for further application or arrangement of a seal, and hence saving time. Because of this it becomes possible to reopen a housing without problems in order to carry out repair, replacement or revision of components located in the housing.

A possible advantageous development of the multipartite housing seal is that wherein a second side of the polymer foam layer, which is opposite the first side, has a thermoplastic film, or the thermoplastic film is applied on the further pressure sensitive adhesive layer.

A thermoplastic film has very minimum adhesive properties or none at all, and so in any conceivable construction of the adhesive strip comprising a thermoplastic film on the second side of the polymer foam layer, the second or first housing element can be detached without residue and free from attachment force. Where one side of the adhesive strips has a very low peel adhesion or none (non-adhesive), the first and second housing elements, after they have been assembled, can be parted again without the multipartite housing seal being damaged, let alone destroyed. The multipartite housing seal can then be used again, this being sustainable and removing the need for further application or arrangement of a seal, and hence saving time. As a result it becomes possible to reopen a housing without problems in order to carry out repair, replacement or revision of components located in the housing.

The thermoplastic film preferably comprises at least one polymer selected from the group consisting of thermoplastic polyolefins (TPE-O or TPO), more particularly thermoplastic polyolefin elastomers (POE) and thermoplastic polyolefin plastomers (POP); thermoplastic polystyrene elastomers (TPE-S or TPS), more particularly styrene block copolymers (SBC); thermoplastic polyurethane elastomers (TPE-U or TPU); thermoplastic polyester elastomers and copolyesters (TPE-E or TPC); thermoplastic copolyamides (TPE-A or TPA); and thermoplastic vulcanizates and also crosslinked thermoplastic polyolefin elastomers (TPE-V or TPV).

The thermoplastic film more particularly consists of at least one, more preferably one, polymer selected from the group consisting of thermoplastic polyolefins (TPE-O or TPO), more particularly thermoplastic polyolefin elastomers (POE) and thermoplastic polyolefin plastomers (POP); thermoplastic polystyrene elastomers (TPE-S or TPS), more particularly styrene block copolymers (SBC); thermoplastic polyurethane elastomers (TPE-U or TPU); thermoplastic polyester elastomers and copolyesters (TPE-E or TPC); thermoplastic copolyamides (TPE-A or TPA); and thermoplastic vulcanizates and also crosslinked thermoplastic polyolefin elastomers (TPE-V or TPV).

With particular preference the first adhesive strip and second adhesive strip have substantially the same thickness d, in particular a thickness d of between 0.1 mm+1-0.02 mm and 8.0 mm+1-0.2 mm, more preferably a thickness d of between 1.5 mm+1-0.2 mm and 3.0 mm+1-0.2 mm.

By means of an equal thickness d of the first and second sealing strips, the edge faces which form the first and second sealing gaps are the same size, or at least approximately the same size, and so the edge faces are eventually arranged at their top side, i.e., on the side of the top side of the adhesive strip, and on their bottom side, i.e., on the side of the bottom side of the adhesive strip. In that case there is no edge or a gap. This improves the sealing of the sealing gaps and the sealing at between housing element and first and second adhesive strip.

If the thickness d is less than 0.1 mm, the adhesive strips may be too greatly compressed when pressed together between the housing elements, and may tear apart, so making the housing seal no longer sealed.

If the thickness d is greater than 8.0 mm, it may be the case that the adhesive strips expand very greatly when pressed together between the housing elements, and swell out between the housing elements.

Particularly preferred, therefore, is a thickness d of between 1.5 mm and 3.0 mm. Adhesive strips having such thicknesses are able sufficiently to absorb force when pressed together, but also do not swell out between housing elements.

The multipartite housing seal can be advantageously developed by the second adhesive strip being a self-adhesive elastic diecut. A self-adhesive elastic diecut refers to an adhesive strip which is brought into a particular geometric shape by a diecutting operation. The geometric shape is preferably adapted to the arrangement of the first and second end portions of the first adhesive strip. In particular the edge faces of the first and second end portions of the first adhesive strip and of the diecut are in tangential contact, so that first and second sealing gaps are formed. The properties and the preferred layer constructions of the diecut correspond to those properties and layer constructions set out above for the adhesive strips.

A diecut can have a complex geometric shape so therefore enabling, in particular, other shapes of the kind possible with adhesive strips which are removed from an adhesive tape roll. Accordingly it is possible, for example, through the use of a diecut, to generate a closed outer contour of the multipartite housing seal. This closed outer contour may then also form a concluding edge with the housing elements.

It is preferred, if the first housing element and the second housing element are pressed against one another with a force F, that the thickness d of the first adhesive strip and the second adhesive strip is reduced by 10% to 60%, more preferably by 30% to 50%. This achieves sufficient expansion of the first and second adhesive strips, and so the first and second sealing gaps are sealed off. There is a proportional relationship between the reduction in the thickness d and in the force F. The greater the force F acting on the first and second housing elements, the greater the reduction in the thickness d of the first and second adhesive strips. The thickness d is preferably reduced between 10% and 60%. A reduction of at least 10% is achieved because the applied pressure is sufficiently great and sufficient expansion of the adhesive strips occurs, and so the first and second sealing gaps are sealed off.

The reduction in thickness, however, must also not be too great, since otherwise the first and second adhesive strips may expand very greatly when pressed together between the housing elements, and could swell out between the housing elements. There may also be damage to the adhesive strips. In particular, an excessive compression, i.e., reduction in the thickness d, may amount to delamination of the polymer foam layer from one pressure sensitive adhesive layer, or to delamination of the polymer foam layer from the thermoplastic film, with the possibility of consequent leaks.

A reduction in the thickness d of between 30% and 50% is suitable particularly for adhesive strips comprising foamed polymer foam layers based on acrylates. In this way a good sealing effect is ensured and damage to the adhesive strip is avoided.

The multipartite housing seal can advantageously be developed by a length l of the second adhesive strip amounting at least to the length $l_A$ of the application gap plus twice the width b of the first adhesive strip, more preferably amounting at least to the length $l_A$ of the application gap plug five times the width b of the first adhesive strip. As a result, the edge faces in contact are generated between first and second adhesive strips in a size which ensures reliable sealing.

The object is achieved in its second aspect by a method for automated application of a multipartite housing seal.

The method comprises the steps of
a) providing a first housing element,
b) applying a first elastic adhesive strip by means of a robot-guided application head along a first predetermined contour on the first housing element by
traveling the first contour and at the same time unwinding and pressing-on an adhesive strip material from an adhesive strip roll,
removing the adhesive strip material at the end of the traveled first contour by the application head and
depositing the first removed adhesive strip material on the first housing element, so that there is an application gap, and
where a first front side of the first removed sealing strip material and a second front side of the first removed adhesive strip material are arranged by the application head opposite one another and separated from one another by the application gap, and
c) applying a second elastic adhesive strip by means of the robot-guided application head along a second predetermined contour on the first housing element by
traveling the second contour and at the same time unwinding the adhesive strip material from the adhesive strip roll and pressing-on the adhesive strip material,
removing the adhesive strip material at the end of the traveled second contour by the application head,
depositing the second removed adhesive strip material on the first housing element, and
where the second removed adhesive strip material is applied on the first housing element by the robot-guided application head such that a first edge face of the second adhesive strip is in contact with a first edge face of the first adhesive strip and forms a first sealing gap, and a second edge face of the second adhesive strip is in contact with a second edge face of the first adhesive strip and forms a second sealing gap, and a third edge face of the second adhesive strip conceals the application gap.

Firstly, the particular arrangement of the adhesive strips of the multipartite housing arrangement enables automated application by means of a robot-guided application head. Secondly, application of a continuous product by a robot-guided application head is only made possible by virtue of the fact that the housing seal is designed in multipartite form. The arrangement of the multipartite housing seal in accordance with the invention therefore has particular advantages in relation to its application by a robot-guided application head.

The multipartite housing seal has the properties and advantages set out in the text above, which therefore are not repeated at this point.

The term "contour" is intended to denote a predetermined travel path for a robot-guided application head. A robot is any multiaxial—at least biaxial—robot. At its most simple, it is a plotter or a gantry robot. However, SCARAs or five-axis and multiaxial industrial robots are also covered by the term "robot" in the sense of this invention.

An application head means an apparatus with which an adhesive tape can be unwound from a roll and the unwound part of the adhesive tape can be removed. Such application heads are known in the prior art.

The method can advantageously be developed by first the first adhesive strip being applied to the first housing element and then the second adhesive strip being applied to the first housing element. In this way, first, the application gap is formed by the first adhesive strip. The second adhesive strip can then be placed precisely onto the edge faces of the first and second end portions, and the application gap sealed. In this case a sensor may determine the exact position and/or length of the application gap and may guide the robot-guided application head so that the second adhesive strip is brought into contact approximately to equal extents with the first and second end portions of the first adhesive strip. The sealing effect can be ensured in this way.

The method, however, can also be performed such that first the second adhesive strip is applied to the first housing element and then the first adhesive strip is applied.

A possible advantageous development of the method is that wherein the application head is moved before application in step c) such that a part of the edge face of the second adhesive strip and a part of the first or second edge face of the first adhesive strip are brought into contact. Because the edge faces of the adhesive strips are already in contact before the second adhesive strip is placed on the first housing element, it is possible for the second adhesive strip to conform closely to the edge face of the first adhesive strip when the second removed adhesive strip material is deposited on the first housing element. As a result of this, it is possible for a sealing effect to be generated more reliably. The operation of applying the multipartite housing seal hence becomes more reliable, and the risk of leaks is reduced.

The requirements regarding the orientation and positioning of the robot-guided application head are reduced, moreover, because the second adhesive strip "moves correctly" when it is deposited. It is, however, important for the first and second adhesive strips to overlap in their longitudinal direction, in other words not to have, for instance, a spacing from one another, so that after deposition on the first housing element there is a gap or a space between first and second adhesive strips.

A possible advantageous development of the method is that the second adhesive strip is provided in the form of a self-adhesive elastic diecut and the application head is configured to apply this diecut on the first housing element, so that an edge face of the self-adhesive elastic diecut is brought into contact with the first and second edge faces of the first adhesive strip and first and second sealing gaps are formed, and a third edge face of the self-adhesive elastic diecut conceals the application gap.

Regarding the properties and advantages in relation to the use of a diecut, reference may be made to the observations above.

Test Methods

Gel permeation chromatography for determining the molecular weight:

The figures for the molecular weight in this specification are based on the determination by gel permeation chromatography. The determination is made on 100 µl of sample which has undergone clarifying filtration (sample concentration 4 g/l). The eluent used is tetrahydrofuran with 0.1 vol % of trifluoroacetic acid. The measurement is made at 25° C. The precolumn used is a column of type PSS-SDV, 5µ, $10^3$ Å, ID 8.0 mm×50 mm. Separation takes place using the columns of type PSS-SDV, 5µ, $10^3$ Å and also $10^5$ Å and $10^6$ Å, each with ID 8.0 mm×300 mm (columns from Polymer Standards Service; detection using differential refractometer Shodex R171). The flow rate is 1.0 ml per minute. Calibration takes place against PMMA standards (polymethyl methacrylate calibration).

Sealing Test:

A multipartite housing seal of the invention was adhered in accordance with the method of the invention to a first square metal plate (external dimensions 80 mm×80 mm×5 mm). The adhesive strips here were arranged such that they formed a closed square contour in the form of a square. Specifically, the second adhesive strip was arranged outside the circulation formed by the first adhesive strip. The second adhesive strip covers the application gap such that a closed outer contour is formed. The first and second edge faces of the first and second end portions of the first adhesive strip were in contact with the first and second edge faces of the second adhesive strip. Applied inside the square subsequently was a paste ($KMnO_4$), which undergoes a distinct violet coloration on contact with water. An identical metal plate was then placed onto the construction and secured with screws. The screws were located outside the square composed of adhesive strips and therefore did not pass either through the interior of the square or through the adhesive strips themselves. The distance between the metal plates was adjusted to exactly 2 mm by means of 2 shims each 1 mm thick. This construction ensured that the water-reactive paste is in a closed space (housing interior) within the adhesive strips. Any penetration of water would be apparent from a color change and would indicate leakage of the multipartite housing seal.

The entire sample was then put in a water bath, which was then placed into an autoclave. Initially a slight superatmospheric pressure of 0.3 bar was applied; in a second test, a superatmospheric pressure of 3 bar then simulated a water column of 30 m. After 30-minute storage under water in the autoclave, the pressure was let down, the assembly was removed, and examination took place for color change of the $KMnO_4$. A color change indicates water-permeability of the multipartite housing seal; no color change indicates sealing with respect to water (result "water-permeable yes/no").

Reopenability of the bonded substrate (simulation of the reopening of a bonded battery cover):

Using a more strongly adhering side of the adhesive strips (bottom side of the adhesive strips), the multipartite housing seal was applied to an aluminum plate (450×250 mm, 2.5 mm thickness) at a distance from the plate edge of 30 mm once all round with the exception of the application gap. In this case, an application gap with a length $l_4$ of 5 mm was provided. A further aluminum plate (450×250 mm, 1 mm thickness) having identical dimensions was applied to the top side of the adhesive strips. The distance between the metal plates was adjusted to exactly 2 mm by means of 2 shims each 1 mm thick, and a joint is formed. A screw clamp was then used to press the assembly together. The aluminum plates were thereafter screwed together using holes present for this purpose in the corners of the plates.

The resulting assembly was stored in a conditioning chamber at 40° C. and 100% relative humidity for 10 days. On removal, it was reconditioned for 24 h at 23° C. and 50% relative humidity.

The screws and shims were then removed, and a tensioning belt connected to a testing machine (Zwick) was inserted into the joint on one of the shorter sides. The upper plate (1 mm thick) was pulled from the multipartite housing seal at a rate of 300 mm/min and an angle of 90°, and the maximum force needed to achieve this was recorded. Table 1 reports the average from three measurements.

The adhesive strips were provided by removal of fixed lengths from the following adhesive tapes:
- A—Tesa® 61102 (closed-cell EPDM rubber foam, coated on one side with an acrylate adhesive, total thickness 3200 µm; tesa)
- B—Tesa® ACX$^{plus}$ 70730 High Resistance (double-sided acrylate foam tape, coated on both sides with pressure sensitive acrylate adhesive, total thickness 2900 µm; tesa), laminated on one side with a thermoplastic polyurethane film (Platilon® U04/PE, 30 µm; Bayer)
- C—Tesa® ACX$^{plus}$ 70730 High Resistance, where the pressure sensitive acrylate adhesive was applied only on one side, so that the acrylate foam was exposed on one side (see B, total thickness 2850 µm; tesa)
- D—Tesa® 92111 HiP—High initial Performance, (bonded on itself 3×, total thickness 3300 µm; tesa); laminated on one side with a thermoplastic polyurethane film (Platilon® U04/PE, 30 µm; Bayer)
- E—Tesa® ACX$^{plus}$ 70730 High Resistance; (double-sided acrylate foam tape, coated on both sides with pressure sensitive acrylate adhesive, total thickness 2900 µm; tesa); comparative example

TABLE 1

Test results

| Adhesive strip from adhesive tape | Water permeability at 0.3 bar | Water permeability at 3 bar | Reopenability |
|---|---|---|---|
| A | No | Yes | |
| B | No | No | Measurement not required; the bonded assembly was very easy to open by hand |
| C | No | No | 148 N |
| D | No | No | Measurement not required; the bonded assembly was very easy to open by hand |
| E (comp.) | No | No | >500 N | comp. = comparative example

The invention is described using various exemplary embodiments in nine figures. These show the following:

FIG. 1 Schematic representation of the multipartite housing seal

Figure 2:
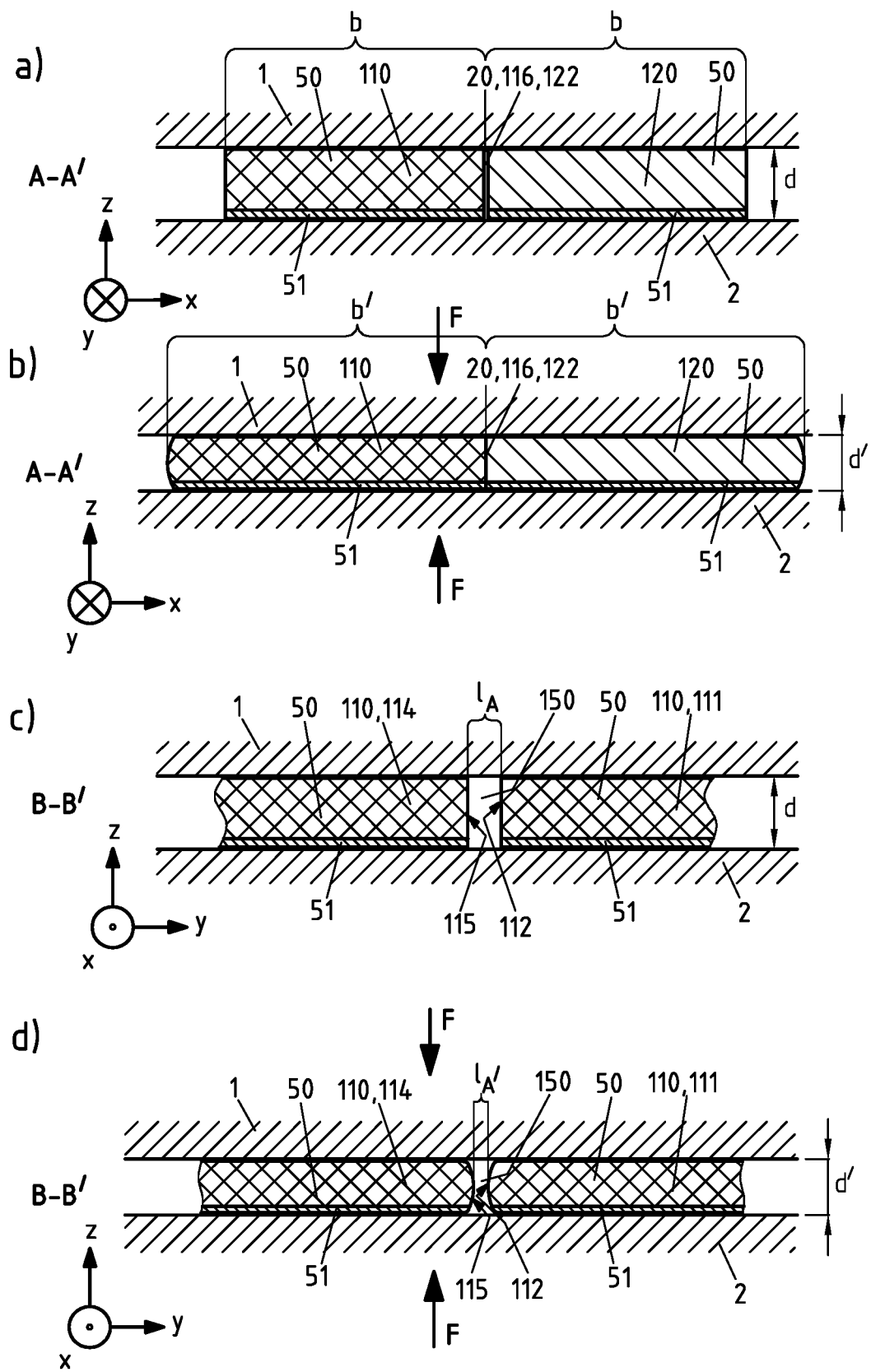

FIG. 2 a)-d) Sections through the multipartite housing seal

Figure 3:
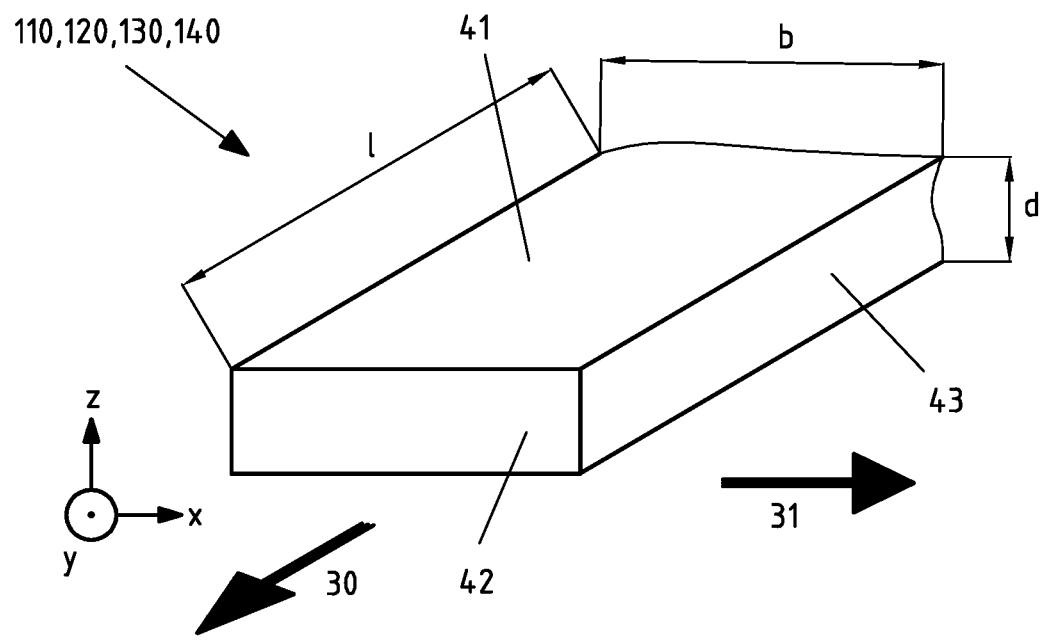

FIG. 3 Definition of the sides and directions of an adhesive strip

Figure 4:
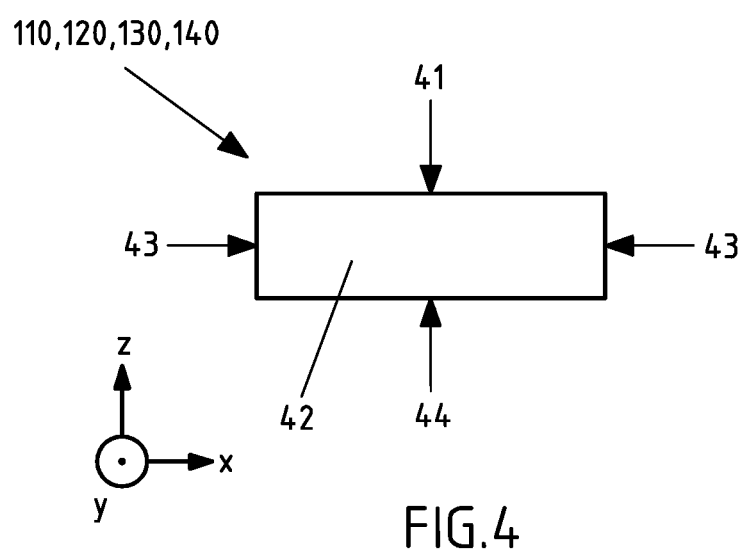

FIG. 4 Definition of the sides and directions of an adhesive strip

Figure 5:
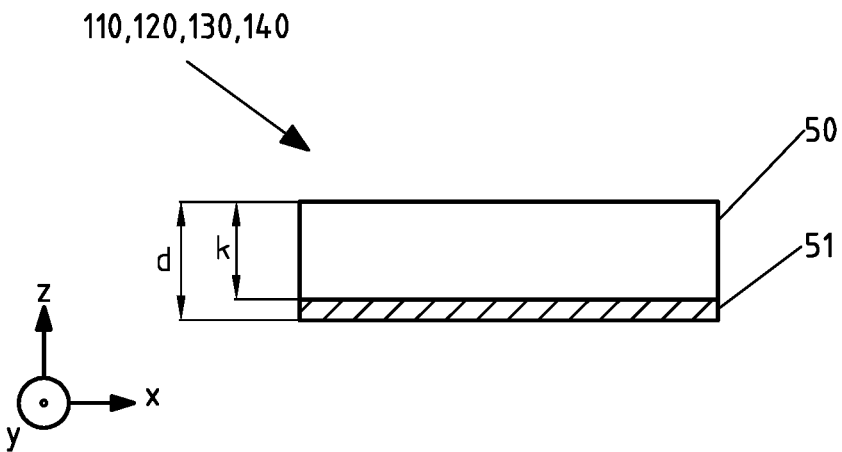

FIG. 5 Layer construction of the elastic adhesive strips in a first variant

Figure 6:
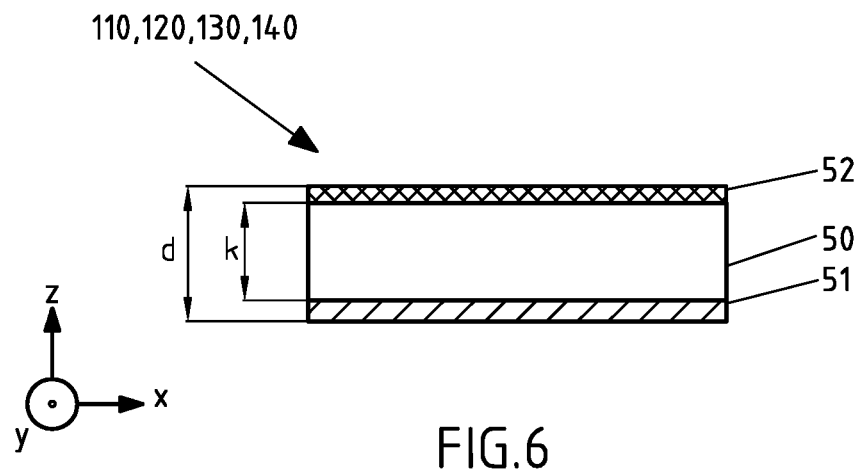

FIG. 6 Layer construction of the elastic adhesive strips in a second variant

Figure 7:
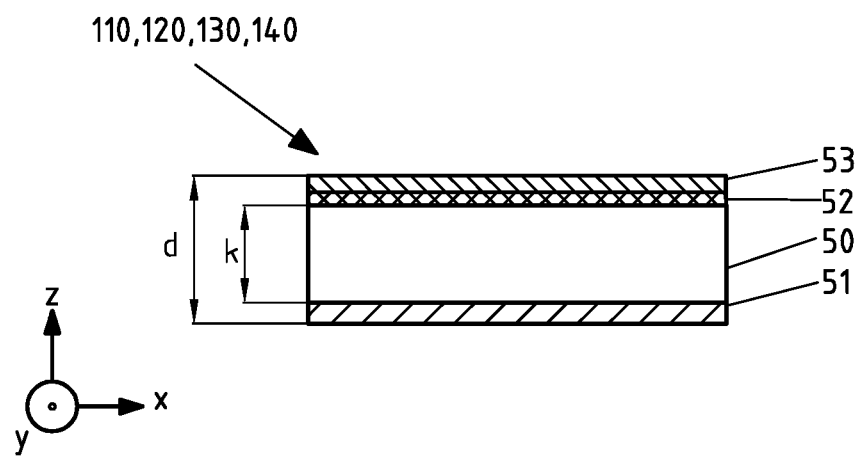

FIG. 7 Layer construction of the elastic adhesive strips in a third variant

Figure 8:
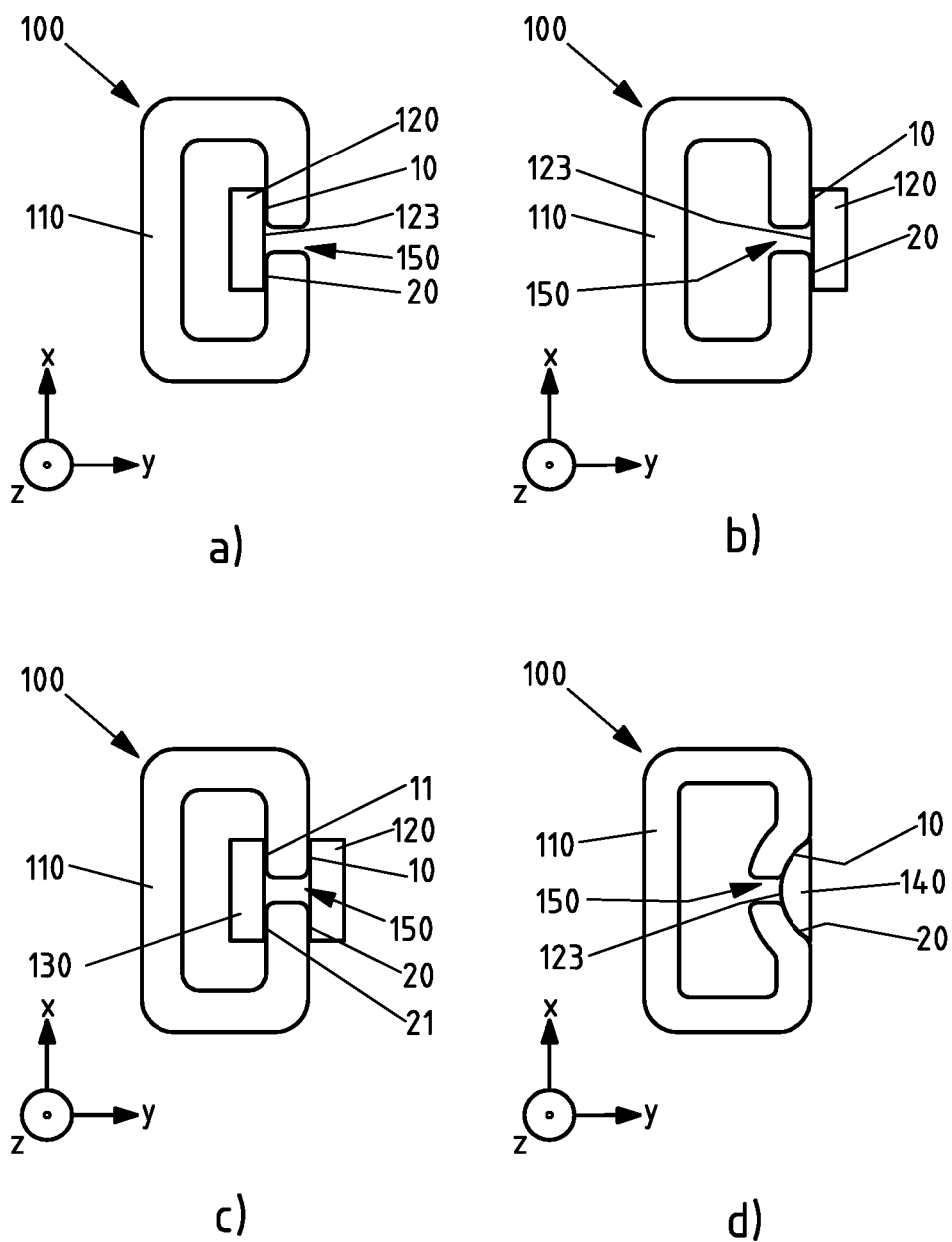

FIG. 8 a)-d) Variants of the arrangement of the multipartite housing seal

Figure 9:
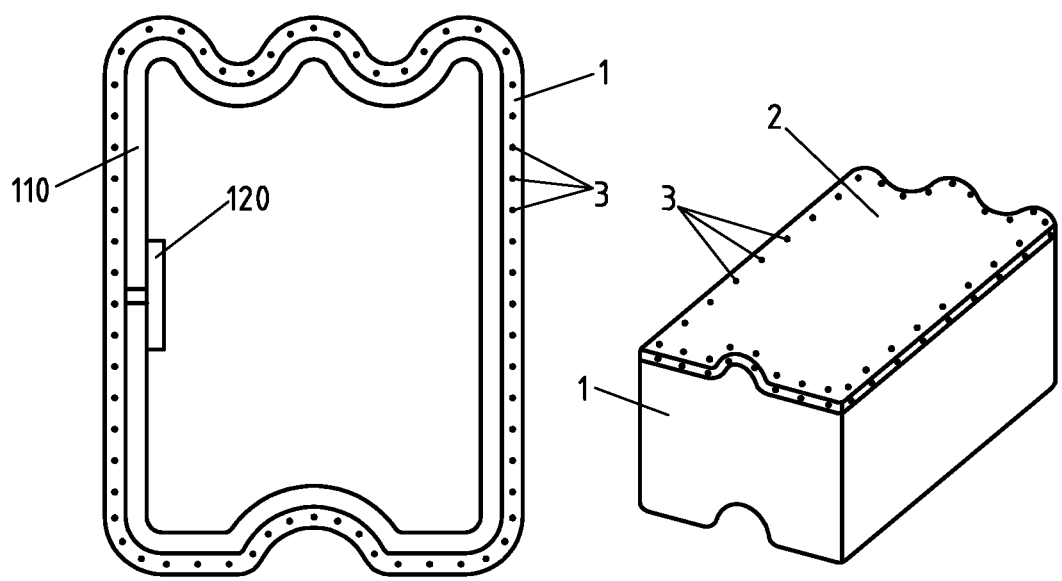

FIG. 9 Illustrative representation of a housing with multipartite housing seal

FIG. 1 represents schematically a plan view of the arrangement of the housing seal 100 of the invention. A first adhesive strip 110 is adhered on a first housing element 1 (not represented). The first adhesive strip here forms a near closed circulation. The circulation is not fully closed, being interrupted by the application gap 150. The first and second front sides 112 and 115 of the first adhesive strip 110 are arranged in such a way that they are opposite one another but do not make contact, thereby forming the application gap 150. As a result of the application gap 150 it is possible for the first elastic adhesive strip 110 to be applied more easily on the housing element 1 by a robot-guided application head (not represented). At the side, the application gap 150 is covered, i.e., closed, by the third edge face 123 of the second adhesive strip 120. The first and second adhesive strips 110, 120 lie in the same plane. In a first end portion 111, the first adhesive strip 110 and the second adhesive strip 120 are in contact via the first edge face 113 of the first adhesive strip 110 and the first edge face 121 of the second adhesive strip 120, and form the first sealing gap 10. In a second end portion 114, the first adhesive strip 110 and the second adhesive strip 120 are in contact via the second edge face 116 of the first adhesive strip 110 and the second edge face 122 of the second adhesive strip 120 and form the second sealing gap 20.

FIG. 2 represents two sections through the multipartite housing seal. The sections lie in the plane AA'—FIGS. 2 a) and b) and in the plane BB'—FIGS. 2 c) and d). The position of the sectional planes is also drawn in FIG. 1.

In FIG. 2 a) a section is represented in the sectional plane AA' through the first elastic adhesive strip 110 and the second elastic adhesive strip 120 in the region of the second end portion 114. In this case the first and second adhesive strips 110, 120 are adhered on the first housing element 1 by means of the pressure sensitive adhesive layer 51. FIG. 2 a) shows the multipartite housing seal, i.e., after an application procedure by an application head. Moreover, the second housing element 2 is placed on the top side of the first and second adhesive strips. The top side of the adhesive strips in this version is formed by the top side of the polymer foam layer 50 of the adhesive strips 110, 120. The first and second elastic adhesive strips 110, 120 are in contact with one another by way of the edge faces 116 and 122, or these faces are at least opposite and make only partial contact with one another, or none. The second sealing gap 20 is formed between the edge faces 116 and 122. The first and second housing elements 1 and 2 are distanced from one another by the thickness d of the adhesive strip.

A sectional plane through the first end portion 111 and the edge faces 113, 121 and also the sealing gap 10 is not represented at this point, since the circumstances there are the same and the representation of FIG. 2 a) is also valid for this section, with the corresponding adaptations.

FIG. 2 b) represents the same sectional plane AA' as in FIG. 2 a), with the difference that a force F is acting on the housing elements 1 and 2. As a result, the first and second elastic adhesive strips 110 and 120 are compressed and the spacing of the housing elements 1 and 2 is reduced to the spacing d' (d>d'). In particular the polymer foam layer 50 of the first and second adhesive strips is compacted and its material compressed. Exposure to the force F causes the polymer foam layers 50 of the first and second elastic adhesive strips 110, 120 to expand in the direction of the edge faces. This is indicated by the bulging of the edge faces. The first and second edge faces 116 and 122 have hardly any ability, or none, to expand or bulge, since these edge faces are already in contact. The expansion instead causes a force and an opposing force to act on the first and second edge faces 116 and 122, thereby pressing the first and second edge faces 116 and 122 against one another and causing them to seal off the sealing gap 20.

A sectional plane through the first end portion 111 and the edge faces 113, 121 and also the sealing gap 10 is not represented at this point, since the circumstances there are the same and the representation of FIG. 2 b) is also valid for this section, with the corresponding adaptations.

In FIG. 2 c) a section is represented in the sectional plane BB' through the first and second end portions 111, 114 of the first elastic adhesive strip 110. The first adhesive strip 110 is adhered on the first housing element 1 by means of the pressure sensitive adhesive layer 51. FIG. 2 c) thus shows the multipartite housing seal after an application procedure. Moreover, the second housing element 2 has been placed onto the top side of the first elastic adhesive strip. The top side in this version of the adhesive strip is formed by the top side of the polymer foam layer 50 of the adhesive strip. The application gap 150 is formed between the first and second end portions 111, 114 of the first elastic adhesive strip 110. The application gap has the length $l_A$. The first and second housing elements 1, 2 are distanced from one another by the thickness d of the first and second adhesive strips (not represented).

FIG. 2 d) represents the same sectional plane BB' as in FIG. 2 c), with the difference that a force F is acting on the housing elements 1 and 2. As a result, the first elastic adhesive strip 110 is compressed, and the distance between the housing elements 1 and 2 is reduced to the distance d' (d>d'). In particular, the polymer foam layer 50 of the first elastic adhesive strip 110 is compressed and its material compacted. As a result of the force exposure with the force F, the polymer foam layer 50 of the first elastic adhesive strip 110 expands in the direction of the edge faces. This is indicated by the bulging of the first front side 112 and of the second front side 115 in the application gap 150. The front sides are likewise edge faces. As a result, the length of the application gap is reduced to the length $l_A'$ ($l_A > l_A'$). In FIG. 2 d), the first and second front sides 112 and 115 are not in contact after the compression of the first adhesive strip ($l_A \neq 0$). It is, however, also possible for the first elastic adhesive strip to expand to such an extent that the front sides 112 and 115 come into contact and form—and seal off—a third sealing gap. For that to be the case, the application gap 150 must be small and must correspond approximately to the expansion experienced by the first elastic adhesive strip 110 on exposure to force.

Represented in FIG. 3 are the sides and directions of an adhesive strip 110, 120, 130 of the invention and the self-adhesive elastic diecut 140. The top side 41 of the adhesive strips is arranged substantially perpendicular to the front side 42 and the edge faces 43. The longitudinal direction of the adhesive strips extends in the direction of the length l of the adhesive strips and is perpendicular to the transverse direction 31 of the adhesive strips. Parts of the edge faces 43 form the sealing gaps 10 and 20 (not represented) when the elastic adhesive strips expand in the direction of the transverse direction when the adhesive strips are compressed. The adhesive strips have the thickness d, the width b and the length l.

FIG. 4 represents a front-side plan view of the front sides 42, 112, 115 of an adhesive strip. The front sides of an adhesive strip are generated by removal from an adhesive tape. The bottom side 44 is arranged opposite the top side 41.

FIG. 5 represents a first preferred layer construction of an elastic adhesive strip 110, 120, 130 or of a self-adhesive elastic diecut 140. The polymer foam layer 50 has a pressure sensitive adhesive layer 51 on the bottom side. The polymer foam layer has the thickness k, and the overall adhesive strip or the self-adhesive elastic diecut has the thickness d.

FIG. 6 represents a second preferred layer construction of an elastic adhesive strip 110, 120, 130 or of a self-adhesive elastic diecut 140. As in FIG. 5, the polymer foam layer 50 has a pressure sensitive adhesive layer 51 on the bottom side. On the top side, this being the second side opposite the first side of the polymer foam layer, there is a further pressure sensitive adhesive layer 52. The peel adhesion of the further pressure sensitive adhesive layer 52 is less than the peel adhesion of the pressure sensitive adhesive layer 51. The polymer foam layer 50 has the thickness k, and the overall adhesive strip 110, 120, 130 or the self-adhesive elastic diecut 140 has the thickness d. In the case of this second variant, therefore, a multipartite housing seal 100 is generated wherein the peel adhesions are asymmetric on the top and bottom sides of the adhesive strips 110, 120.

FIG. 7 represents a third preferred layer construction of an elastic adhesive strip 110, 120, 130 or of a self-adhesive elastic diecut 140. As in FIGS. 5 and 6, the polymer foam layer 50 has a pressure sensitive adhesive layer 51 on the bottom side. On the top side, this being the second side opposite the first side of the polymer foam layer, there is a further pressure sensitive adhesive layer 52. The peel adhesion of the further pressure sensitive adhesive layer 52 may be less than, equal to or greater than the peel adhesion of the pressure sensitive adhesive layer 51. Applied on the further pressure sensitive adhesive layer 52 is a thermoplastic film 53. The polymer foam layer has the thickness k, and the overall adhesive strip or the self-adhesive elastic diecut has the thickness d. In the case of this third variant, therefore, a housing seal 100 having single-sidedly nonadhesive properties is generated.

FIGS. 8 *a*) to *d*) schematically represent four preferred variants of the multipartite housing seal 100. The profile of the first adhesive strip 110 here is chosen as an example and is not in any way to be deemed limiting. The actual profile, i.e., the contour on which the first adhesive strip is applied, may describe any desired other profiles. Only the front sides of the first adhesive strip are to be arranged substantially opposite one another.

FIGS. 8 *a*) and *b*) each represent multipartite housing seals of the invention, where in FIG. 8 *a*) the second adhesive strip is arranged within the circulation formed by the first adhesive strip. This means that the second elastic adhesive strip is in fluid communication with the exterior of the housing only via the third edge face 123. This arrangement has the advantage that a linear surrounding outer edge is present, interrupted only by the application gap 150. The second adhesive strip 120 seals off the application gap 150, which is formed by the distanced deposition of the end portions of the first adhesive strip 110, "from the inside" (housing interior). If the force F acts on the first and second housing elements 1, 2 (not represented), the first and second sealing gaps 10, 20 are sealed off.

FIG. 8 *b*) represents a multipartite housing seal 100 wherein the second adhesive strip 120 is arranged outside the circulation formed by the first adhesive strip 110, and the application gap 150 is sealed off "from the outside" (housing exterior). If the force F acts on the first and second housing elements 1, 2 (not represented), the first and second sealing gaps 10, 20 are sealed off.

FIG. 8 *c*) represents a combination of the variants from FIGS. 8 *a*) and 8 *b*). Starting from FIG. 8 *b*), a further elastic adhesive strip 130 (third elastic adhesive strip) may be arranged within the circulation formed by the first adhesive strip. This arrangement can be applied to a housing element by the method of the invention in an automated way just as well (not represented). The third adhesive strip here preferably has a length similar to that of the second adhesive strip. The advantage of this construction of the multipartite housing seal 100 is that two further sealing gaps are formed—third sealing gap 11 and fourth sealing gap 21—and the application gap is additionally sealed off "from the inside" as well (housing interior). If the force F acts on the first and second housing elements 1, 2 (not represented), the first, second, third and fourth sealing gaps 10, 20, 11, 21 are sealed off. The sealing-off can become more reliable as a result of the additional sealing gaps 11, 21.

FIG. 8 *d*) represents a multipartite housing seal 100 wherein, in contradistinction to FIG. 8 *b*) or 8 *c*), the second adhesive strip 120 is formed by a self-adhesive elastic diecut. The shaping is purely exemplary and is not intended to limit the inventive concepts. The self-adhesive elastic diecut 140 is arranged outside the circulation formed by the first adhesive strip 110, and the application gap 150 is sealed off by the diecut 150 "from the outside" (housing exterior). The first and second sealing gaps 10, 20 are sealed off with the action of force F on the first and second housing elements 1 and 2. The advantage of a diecut is that it can be provided in a predetermined shaped. The diecut is fabricated in precisely cutting manufacturing machines and therefore has uniformly planar edge faces, thus enabling a good sealing effect. This arrangement has the advantage that a linear surrounding outer edge is present, which is also not interrupted by the application gap 150 (cf. FIG. 1).

FIG. 9 represents by way of example a use of the multipartite housing seal 100. The first and second elastic adhesive strips 110 and 120 in accordance with the invention are applied on a first housing element 1. The first housing element 1 here is a housing tub. The second housing element 2 is a cover, which is connected to the housing tub by means of connecting elements 3, such as screws, clasps or rivets, for example, and so the force F acts on the multipartite housing seal 100 and the first and second adhesive strips 110, 120 are compressed. A housing of this kind may be, for example, a protective housing for battery modules.

LIST OF REFERENCE SIGNS

1 first housing element
2 second housing element
3 connection elements
10 first sealing gap
11 third sealing gap
20 second sealing gap
21 fourth sealing gap
30 longitudinal direction
31 transverse direction
41 top side
42 front side
43 edge face
44 bottom side
50 polymer foam layer
51 pressure sensitive adhesive layer
52 further pressure sensitive adhesive layer (weakly adhering layer)
53 thermoplastic film
100 multipartite housing seal
110 first elastic adhesive strip
111 first end portion
112 first front side
113 first edge face (first adhesive strip)
114 second end portion
115 second front side
116 second edge face (first adhesive strip)
120 second elastic adhesive strip
121 first edge face (second adhesive strip)
122 second edge face (second adhesive strip)
123 third edge face (second adhesive strip)
130 third elastic adhesive strip
140 self-adhesive elastic diecut
150 application gap

The invention claimed is:

1. A multipartite housing seal for sealing off a housing interior from a housing exterior, the multipartite housing seal comprising:
   a first elastic adhesive strip and a second elastic adhesive strip, the first and second adhesive strips being arranged between a first housing element and a second housing element,
   wherein:
   the first elastic adhesive strip comprises a first end portion having a first front side and a first edge face, and a second end portion having a second front side and a second edge face, and is arranged between the first housing element and the second housing element such that:

the first front side and the second front side are arranged opposite one another and separated from one another by an application gap;

the first and second edge faces lie substantially in a plane; and the first elastic adhesive strip has an arrangement in a plane located between the first housing element and the second housing element, the arrangement of the first adhesive strip comprises a closed annular configuration with the exception of the application gap; and the closed annular configuration comprises a profile or a contour of the first elastic adhesive strip formed by the arrangement of the first elastic adhesive strip; and the second elastic adhesive strip is arranged between the first housing element and the second housing element such that:

a first edge face of the second elastic adhesive strip is in contact with the first edge face of the first elastic adhesive strip and forms a first sealing gap;

a second edge face of the second elastic adhesive strip is in contact with the second edge face of the first elastic adhesive strip and forms a second sealing gap; and a third edge face of the second elastic adhesive strip conceals the application gap, and further wherein, when the first housing element and the second housing element are pressed against one another with a force F, the first elastic adhesive strip and the second elastic adhesive strip are compressed and expand in the direction of the edge faces, such that:

the first edge face of the second elastic adhesive strip and the first edge face of the first elastic adhesive strip are pressed against one another and seal off the first sealing gap and the second edge face of the second elastic adhesive strip and the second edge face of the first elastic adhesive strip are pressed against one another and seal off the second sealing gap for preventing fluid communication between the housing interior and the housing exterior.

2. The multipartite housing seal of claim 1, wherein the second elastic adhesive strip is arranged relative to the first elastic adhesive strip such that a longitudinal direction of the second elastic adhesive strip:

runs parallel to a longitudinal direction of the first end portion; and runs parallel to a longitudinal direction of the second end portion.

3. The multipartite housing seal of claim 1, wherein at least one of the first elastic adhesive strip and the second elastic adhesive strip comprises a polymer foam layer, and a first side of the polymer foam layer has a first pressure sensitive adhesive layer.

4. The multipartite housing seal of claim 3, wherein the polymer foam layer itself is a pressure sensitive adhesive.

5. The multipartite housing seal of claim 3, wherein a second side of the polymer foam layer is located opposite with respect to the first side of the polymer foam layer and comprises a second pressure sensitive adhesive layer.

6. The multipartite housing seal of claim 5, wherein the second side of the polymer foam layer has a thermoplastic film or the second pressure sensitive adhesive layer is a thermoplastic film.

7. The multipartite housing seal of claim 1, wherein the first elastic adhesive strip and second elastic adhesive strip have a thickness d of between 0.1 mm+/−0.02 mm and 8.0 mm+/−0.2 mm.

8. The multipartite housing seal of claim 1, wherein at least one of the first elastic adhesive strip and the second elastic adhesive strip is an adhesive tape comprising a self-adhesive composition.

9. The multipartite housing seal of claim 1, wherein the second elastic adhesive strip is a die-cut self-adhesive strip having a geometric shape.

10. The multipartite housing seal of claim 1, wherein, when the first housing element and the second housing element are pressed against one another with a force F, the thickness d of the first elastic adhesive strip and of the second elastic adhesive strip is reduced by 10% to 60%.

11. The multipartite housing seal of claim 1, wherein a length l of the second elastic adhesive strip is at least a length $l_A$ of the application gap plus twice a width b of the first elastic adhesive strip.

12. A housing comprising:

the multipartite housing seal, according to claim 1, arranged between the first housing element and the second housing element.

13. A method for automated application of the multipartite housing seal according to claim 1, the method comprising:

a) providing the first housing element;

b) applying, with an application head, the first elastic adhesive strip along a first predetermined contour on the first housing element by:

traveling the first predetermined contour and, at the same time, unwinding and pressing-on an adhesive strip material from an adhesive strip roll;

removing a first adhesive strip material at an end of the traveled first predetermined contour by the application head; and depositing the first adhesive strip material removed on the first housing element such that the application gap is formed, wherein a first front side of the first adhesive strip material and a second front side of the first adhesive strip material are arranged by the application head opposite one another and separated from one another by the application gap; and c) applying, with the application head, the second elastic adhesive strip along a second predetermined contour on the first housing element by:

traveling the second predetermined contour and, at the same time, unwinding the adhesive strip material from the adhesive strip roll and pressing-on the adhesive strip material;

removing the second adhesive strip material at the end of the traveled second predetermined contour by the application head; and depositing the second adhesive strip material on the first housing element, wherein the second adhesive strip material is applied on the first housing element by the application head such that:

the first edge face of the second elastic adhesive strip is in contact with the first edge face of the first elastic adhesive strip and forms the first sealing gap, and the second edge face of the second elastic adhesive strip is in contact with the second edge face of the first elastic adhesive strip and forms the second sealing gap, and the third edge face of the second elastic adhesive strip conceals the application gap.

14. The method of claim 13, wherein the first elastic adhesive strip is first applied to the first housing element and the second elastic adhesive strip is subsequently applied to the first housing element.

15. The method of claim 13, further comprising:
- moving the application head, prior to application in c), such that a part of the third edge face of the second elastic adhesive strip and a part of the first edge face or the second edge face of the first elastic adhesive strip are brought into contact with each other.

16. The method of claim 13, wherein the second elastic adhesive strip is provided in the form of a die-cut self-adhesive strip having a geometric shape and the application head is configured to apply the die-cut self-adhesive strip on the first housing element such that an edge face of the die-cut self-adhesive strip is brought into contact with the first and second edge faces of the first elastic adhesive strip and first and second sealing gaps are formed, and a further edge face of the die-cut self-adhesive strip conceals the application gap.

\* \* \* \* \*